(12) United States Patent
Brotz

(10) Patent No.: US 6,978,240 B1
(45) Date of Patent: Dec. 20, 2005

(54) SPEECH TRANSLATION SYSTEM UTILIZING HOLOGRAPHIC DATA STORAGE MEDIUM

(76) Inventor: Gregory R. Brotz, P.O. Box 1322, Sheboygan, WI (US) 33081

( * ) Notice: Subject to any disclaimer, the term of this patent is extended or adjusted under 35 U.S.C. 154(b) by 579 days.

(21) Appl. No.: 10/061,843

(22) Filed: Jan. 31, 2002

(51) Int. Cl.[7] ............... G06F 17/27; G06F 17/20; G10L 21/06
(52) U.S. Cl. ............... 704/277; 704/3; 704/8; 704/251; 704/278
(58) Field of Search ............... 704/3, 8, 206, 704/278, 241, 251, 254, 270, 275, 277

(56) References Cited

U.S. PATENT DOCUMENTS 3,636,261 A * 1/1972 Preston, Jr. ............... 359/15
3,824,546 A * 7/1974 Kawasaki et al. ............... 382/206
3,869,575 A * 3/1975 Spitz et al. ............... 359/25
4,343,969 A * 8/1982 Kellett ............... 704/251
4,348,553 A * 9/1982 Baker et al. ............... 704/237
4,998,236 A * 3/1991 Henshaw ............... 369/103
6,070,140 A * 5/2000 Tran ............... 704/232
6,134,529 A * 10/2000 Rothenberg ............... 434/167
6,256,281 B1 * 7/2001 Tanaka et al. ............... 369/103
6,278,968 B1 * 8/2001 Franz et al. ............... 345/171

* cited by examiner

Primary Examiner—Vijay Chawan
Assistant Examiner—V. Paul Harper
(74) Attorney, Agent, or Firm—William Nitkin

(57) ABSTRACT

A speech translation system and method are disclosed utilizing a holographic storage medium having a plurality of frames therein, each frame containing one or more discrete speech wave forms thereon for comparison with a spoken word wave form to select a wave form of a second language of equivalent meaning which through a digital audio player can be made audible for speech translation.

2 Claims, 1 Drawing Sheet

SPEECH TRANSLATION SYSTEM UTILIZING HOLOGRAPHIC DATA STORAGE MEDIUM

BACKGROUND OF THE INVENTION

1. Field of the Invention

This invention resides in the field of speech translation and more particularly relates to a device and methodology for speech translation wherein the speech translation data is stored within a holographic storage material and is optically accessed.

2. History of the Prior Art

There are many speech translation systems for the translation of spoken speech from one language to another which utilize the electronic comparison of the spoken speech with stored electronic data utilizing traditional silicon computer chips with circuitry programmed to retrieve data from a digital storage device including hard disks, magnetic disks and tape storage systems to produce a translation thereof.

SUMMARY OF THE INVENTION

It is a principal goal of this invention to provide a speech translation system to replace the prior art method of speech translation utilizing data storage on hard disks or magnetic tapes by providing a new, primarily optical translation system apparatus and method utilizing holographic data storage which optical system functions at a significantly higher speed than prior art electronic data storage/retrieval systems.

It is a further object of this invention to provide an improved speech translation system for high speed word and sentence translation and for the transmittal of such translated speech utilizing holographic storage material technology for the storage of the words or phonemes of one or more languages.

Holographic storage medium is well known in the art in which a large plurality of images can be stored in distinct angular planes which are accessed by a object and reference beams for retrieval thereof. In one of its simplest forms the system of this invention can provide a plurality of accessible image frames within the holographic storage material acting as a holographic data storage medium. An object beam and a reference beam projected into the holographic storage material can access and detect selected of such frames. In this invention a data base of multiple holographic language word wave form frames can be created within the holographic storage material. Each wave form frame can depict the wave form or the selected depiction of a character, phonemes, words, phrases, sentences or any other segment of speech, code, text or pictogram; and the position of that frame containing each depiction, such as of a word, can also be stored in a storage device. Hereinafter any reference to wave form shall be considered to include any form of depiction of a word, phrase or the like in a frame. Further, any reference to "word" shall be considered to include all other speech segments or depictions as described above. Incoming speech can be parsed into word or phrase segments, and its wave form can be graphically displayed on a pixilated input device such as a liquid crystal display (LCD) screen or equivalent. A detector, such as a charged coupled device (CCD), can be positioned to detect the wave form that is displayed on the input device. A comparator device can receive such wave form. A second detector can be positioned to detect the discrete wave forms scanned within such holographic storage material and to direct such information also to such comparator device. When a match is detected, the comparator sends the position of that identified matching frame in the holographic storage material to a position location storage device which in one embodiment can contain a recording of the sound of all words in whatever desired other language into which the first language is to be translated, each word corresponding to a frame position and transmits the word associated with the selected frame that is the translated speech segment to a speaker device in a desired location where it is broadcast to be heard.

In a preferred embodiment of this invention the speech translation system can be entirely optical in nature wherein each stored image frame contains a portion having the first language word depicted in its wave form and another portion having at least one second language wave form of a second language corresponding in meaning to the first language wave form. For example, a microphone can be provided into which a user speaks in a first language. That language is processed through a speech parser, and the words are displayed in a wave form on, for example, an LCD data display which displays such wave form. A correlation detector observes the wave form of the spoken speech segment and compares that wave form to the plurality of scanned wave form frames as they become recognizable to the correlation detector by the action of a reference beam scanning the holographic storage medium. When a match is detected between the wave form from the spoken word in the first language, the image of the matching scanned frame is scanned to detect the portion thereof which contains the wave form of the word in the second language which second language wave form is transmitted optically to an image detector wherein that wave form is processed by a digital audio player to produce the sound of that wave form through a speaker device which produces an audible version of the initially spoken word but in the second language. The scanning process word-by-word is accomplished extremely quickly through constant scanning of the reference beam through the holographic storage medium until a match with the first speech wave form is found, and the second desired speech wave form can then be projected to a CCD detector screen or other machine vision device where it can be recognized by a system that can store such data and transmit an audible representation of the wave form relating to the initial spoken word but of the second language depicted in the frame selected. Multiple other languages can be stored on each wave form frame with the first language so that the image capture circuitry can be adapted to pick up the frame segment of the desired language into which the initially spoken language is to be translated. The translations can be sent back to the same location as that of the microphone or they can be transmitted to remote locations as would be required in a telephone conversation where instantaneous translation of a user's speech is desired. A similar system can be provided utilizing a microphone at the remote second location for responsive speech to be translated and heard back at a first location, or the second user at the remote location can use the same translating system as the initial speaker for his language to be translated, or another translating system can be used that is separated from the first translating system. Both speakers, if they are at the same location, can utilize the same microphone and speaker device as long as the system is directed as to what is the language of the received spoken language and into what language it is to be translated.

DESCRIPTION OF THE PREFERRED EMBODIMENT(S)

Figure 1:
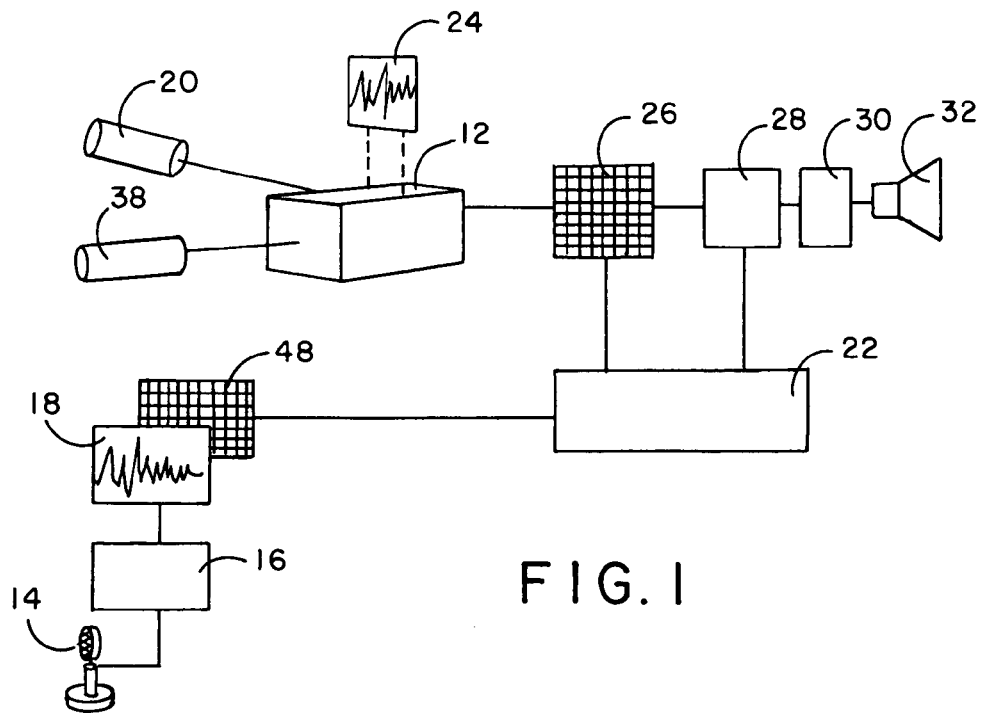
FIG. 1 illustrates a schematic diagram of a basic system of this invention utilizing a holographic storage medium.

FIG. 1 illustrates a schematic diagram of a basic system of this invention utilizing a holographic storage material 12 which contains a plurality of image frames 24 depicted for illustrative purposes only above material 12 but which is actually within holographic storage medium 12, with a wave form on frame 12 corresponding to one word or phrase of the spoken speech. The user's words in a first language are detected by microphone 14 and pass through a parsing circuit 16 where they are logically parsed into discrete wave forms representing such words. The wave forms are individually and sequentially displayed on a pixilated input device, such as a liquid crystal display (LCD) 18. A first detector array 48, such as a CCD, senses the wave form and sends that image to a correlation detector 22. At the same time a second detector array 26 senses the stored images of each frame in holographic storage material 12 as it is scanned by reference beam 20 from object beam 38 and also directs those images to correlation detector 22 where the image of the spoken speech wave form and the scanned stored speech wave form are compared. When a match is found, the position of that frame 24 within the holographic storage material 12 is sent to data base 28 where information is stored relevant to the position of that frame sufficient to produce synthesized speech in the second language into which the spoken speech is to be translated. For example, the stored data corresponding to the stored image frame 24 selected can produce a wave form of the word in the second language which passes through a digital audio player 30 and is broadcast from speaker device 32 where a listener can hear a translation in a second language of the spoken speech of the first speaker as such words are processed by the system of this invention.

Figure 2:
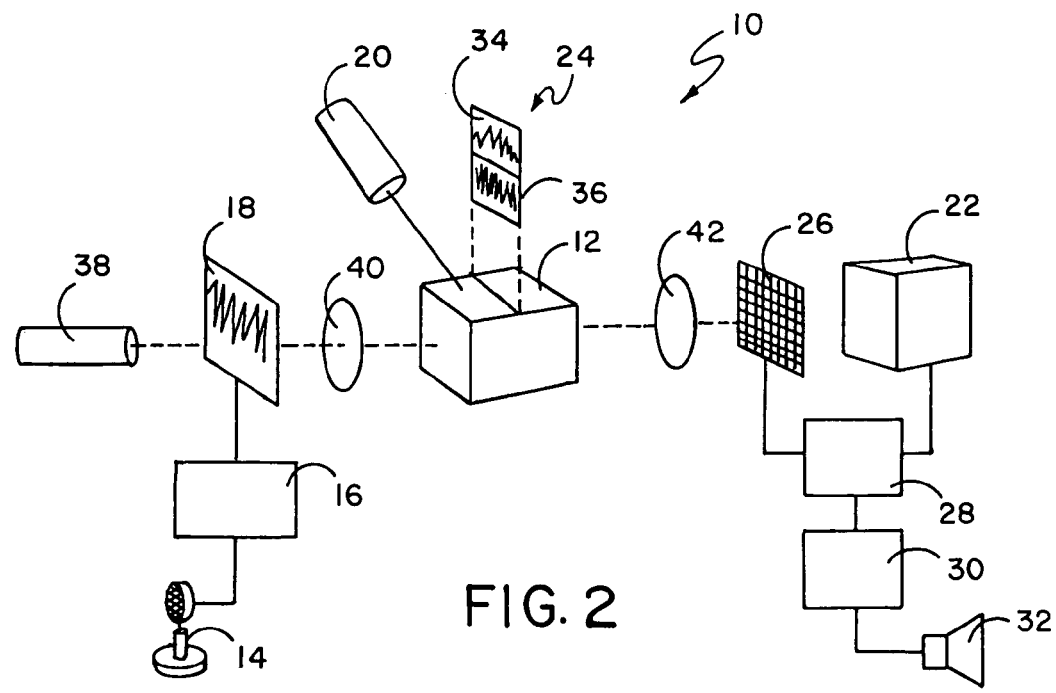
FIG. 2 illustrates a schematic diagram of a more advanced holographic speech translation system of this invention with optical speech translation occurring between a first user at a microphone and a second user.

FIG. 2 illustrates a schematic diagram of a preferred embodiment of the language translation system 10 of this invention. In this preferred embodiment the translation occurs entirely within the optical system which use can increase the translation speed substantially. Seen in this diagram is microphone 14 which receives the spoken speech and sends the resulting signal through a parsing circuit 16 where it is logically parsed into discrete wave forms, for example, representing words. The wave forms are individually and sequentially displayed, for example on an LCD screen 18, such that for each word a complex wave form appears on LCD screen 18. A holographic storage medium, such as for example a holographic storage crystal, is provided with a large plurality of different wave form images, each on a discrete frame, such as image frame 24 with each frame representing a different word which are all stored in various planes and which are illuminated by object beam 38 and a moving reference beam 20 disposed at angles to one another which object beam 38 and reference beam 20 usage are well known when used with holographic storage material 12 for isolating a single image plane for the viewing thereof. Each image frame 24 is comprised of multiple speech wave forms such as depicted in image frame 24 shown, for purposes of illustration, above holographic storage medium 12 but which image frame in actuality would be located within medium 12. A correlation detector 22 is arranged to receive the images of the first language wave form of LCD 18 and any visible frame of the scanned speech wave forms within holographic storage material 12. When correlation detector 22 detects the same or similar wave form in section 34 of image frame 24 within the holographic storage material 12 as it is scanned by reference beam 20 as the speech sample display 18, a match has been made. On the speech sample image frame 24 that is designated as a match there is at least one second language wave form 36, and there could be other language wave forms. The second language wave form 36 that is then selected is projected onto an image receiver 26 by object beam 38 which image receiver 26 can be a CCD image receiver or other machine vision device and that wave form is then read by a digital audio player 30 which reconstitutes that second language wave form into audible sound and broadcasts it through speaker device 32 where it is heard as a word in the second language into which the first language has been translated. Similar systems as that illustrated in FIGS. 1 and 2 can be provided for the translation of the speech of the second user who speaks the second language back to the first language of the first user so that simultaneous translation in real time can occur.

The system can also include additional apparatus for the reduction of ambient noise and for the storage of phrases as well as individual words for the even faster translation of multiple words that can be matched to stored wave form samples of multiple words. The system of this invention relies on the fact that words when displayed in a wave form, even when spoken by different persons, will still substantially match the base wave form that is stored within the holographic storage material. The wave form produced and searched for can utilize the techniques of statistical high points corresponding to similar wave forms and can search not necessarily for exact wave form matches but for wave forms which conform to the pattern created when the first speech is converted into its wave form. The comparator can utilize the laser object beam and reference beam that quickly scan the holographic storage material to receive at the same time the object beam through the speech sample display to align the two-dimensional imagery of the speech sample display and the stored speech sample image. This comparison process can be achieved, for example, by comparing the intensity of the image such that the most reduction in light received might be accomplished when the speech sample wave form coincides and overlaps the stored speech sample wave form in the holographic storage medium. In one embodiment a spatial Fourier transformation can be done on the intensity profile with an inverse Fourier transformation being performed on the images including echo or shadow images of the wave forms, resulting in a correlation or convolution of the initial speech form data and the stored speech form data. When the correlation detector detects a very high correlation between the stored speech sample wave form and the wave form of the speech sample, a change in sensitivity to the data can be detected and that frame on which the reference beam is directed can then be projected by the object beam with the portions thereof carrying wave form speech data in the second language directed onto and picked up by image receiver 26. In order to reduce the amount of scanning necessary for the object beam and reference beam which, if they are lasers, generally have a narrow focus, beam expanders can be used to spread the laser light intensity over a wider area such as first apodizer 40 and second apodizer 42. First apodizer 40 can also be positioned between the laser producing object beam 38 and liquid crystal display 18 in order to create a homogenization of the laser beam to produce a uniform light intensity on liquid crystal display 18 acting as a beam expander such that the light covers the liquid crystal display frame 18. Also collimators can be utilized to control the beam's convergence and divergence as desired along with polarizers to yield the optimum interaction of the light beam with the stored interference patterns in the holographic storage medium. In some cases frequency shifting means or multiple lasers producing different wave length light beams can be utilized especially when recordings are created with multifrequencies. Well known light beam-directing scanners can also be used to cause the light to move across the liquid crystal display at various desired angles. In some embodiments the light beam can be directed along a fixed axis while the holographic storage medium is moved to place itself at various angles to the light beam, or in an alternate embodiment both the light beam and holographic storage medium can be moved simultaneously in order to increase the speed of access or increase the number of frames that can be stored in the holographic storage medium. Basically image receiver 26 can be, for example, a camera since it must view and be able to record the selected wave form within the plane in the holographic storage medium that has been made visible by the reference beam and object beam to view its reconstructed image. The object beam can exit the holographic storage medium and carries with it the shadow, reflected or interference image of the selected stored image wave form. The wave form is then picked up by the image receiver and directed through digital audio player 30 which reconstitutes such wave form into audible speech.

In one embodiment because of the light intensity reduction which occurs when a match of the speech wave form and stored wave form is made, correlation detector 22 in such embodiment can be as simple a device as a light intensity detector to indicate a match when the light intensity drops due to matching patterns of the speech wave form and stored wave form blocking more light when they coincide or when such light level changes to a predetermined level. In other embodiments the match of the speech wave form and stored wave form may cause an increase in light intensity.

When searching for phrases, idiomatic expressions, particular jargon and dialect, contextual information can be added by known computer programs to direct the laser object and reference beams to particular angles within the holographic storage medium where which such phrases and unique expressions can be stored.

The storage of multiple languages within one or more holographic storage media or crystals also allows for the translation of speech in one language into multiple languages simultaneously if there are multiple listeners who are conversantes in different languages. Holographic storage medium can form libraries where speech signals can be stored as wave forms on holographic frame templates arranged in the varied planes of the holographic storage medium.

Although the present invention has been described with reference to particular embodiments, it will be apparent to those skilled in the art that variations and modifications can be substituted therefor without departing from the principles and spirit of the invention.

I claim:

1. A speech translation system, comprising:
   means to obtain a spoken word segment wave form from a user speaking in a first language;
   a holographic storage medium containing a plurality of accessible frames, each frame depicting a first speech wave form representing a first language segment and at least one other wave form representing a second language segment, said other wave form having the same meaning as said first language segment;
   means to compare said spoken word wave form with said wave forms scanned within said holographic storage medium corresponding to said first language segment;
   means to read said selected frame of said first language in the area of said frame having the language segment depiction in said second language;
   means to synthesize a language segment from said scanned second language area on said selected frame to produce an audible word in said second language of equivalent meaning to said word in said first language;
   an object beam passing through said holographic storage medium;
   a movable reference beam scanning said holographic storage medium, said reference beam able to make detectable a selected frame;
   a first wave display suitable for displaying said spoken word segment wave form;
   means for scanning said first wave display and said selected frame within said holographic storage medium for detecting when said wave form of said first wave display matches a scanned wave form within said holographic storage medium; and
   said object beam passing, respectively, through said first wave display and said selected frame from said holographic storage medium to be detected by said means to read said selected frame in the area of said second language depiction, said object beam carrying said selected frame area of said second language depiction to said means to read said selected frame of said holographic storage medium.

2. The speech translation system of claim 1 wherein said means to read said area of said selected frame within said holographic storage medium comprises:
   a CCD device receiving said object beam; and
   wherein said means to synthesize said language segment from said scanned second language area comprises a digital audio player.

* * * * *